United States Patent
Goodine

(10) Patent No.: US 12,323,734 B2
(45) Date of Patent: Jun. 3, 2025

(54) SCREEN SHARE COLLABORATION PLATFORM CAPTURE

(71) Applicant: Zoom Video Communications, Inc., San Jose, CA (US)

(72) Inventor: Christopher Goodine, Westport (CA)

(73) Assignee: Zoom Communications, Inc., San Jose, CA (US)

( * ) Notice: Subject to any disclaimer, the term of this patent is extended or adjusted under 35 U.S.C. 154(b) by 245 days.

(21) Appl. No.: 17/975,348

(22) Filed: Oct. 27, 2022

(65) Prior Publication Data

US 2024/0146873 A1 May 2, 2024

(51) Int. Cl.
  *H04N 7/15* (2006.01)
  *G06F 3/14* (2006.01)
  *G06F 16/955* (2019.01)
  *H04L 12/18* (2006.01)

(52) U.S. Cl.
  CPC .......... *H04N 7/152* (2013.01); *G06F 3/1454* (2013.01); *G06F 16/9566* (2019.01); *H04L 12/1822* (2013.01)

(58) Field of Classification Search
  CPC .......................... H04N 7/152; G06F 16/9566
  See application file for complete search history.

(56) References Cited

U.S. PATENT DOCUMENTS

| 9,300,609 B1* | 3/2016 | Beausoleil | .......... H04L 12/1827 |
| 2014/0019958 A1* | 1/2014 | Sherman | .................. G06F 8/61 |
| | | | 717/178 |
| 2023/0239332 A1* | 7/2023 | Ramsey | .............. H04L 65/1089 |
| | | | 348/14.07 |

* cited by examiner

*Primary Examiner* — Amal S Zenati
(74) *Attorney, Agent, or Firm* — Kilpatrick Townsend & Stockton LLP

(57) ABSTRACT

The present disclosure relates to systems and methods for launching a collaborative application. The systems and methods include starting a virtual meeting, within a video conferencing solution, between at least a first user and a second user, monitoring for an attempt to share content through a graphical user interface for the virtual meeting, and determining that the first user is attempting to show the shared content to the second user through a collaboration platform that is separate from the video conferencing solution. The systems and methods also include identifying a native application associated with the collaboration platform and integrated with the video conferencing solution, notifying the first user that the native application is available for collaboration within the virtual meeting, and launching the native application within the virtual meeting.

20 Claims, 9 Drawing Sheets

SCREEN SHARE COLLABORATION PLATFORM CAPTURE

FIELD

The present disclosure relates generally to improved collaboration between remote users, and more particularly, to providing a platform for recognizing and enabling users to collaborate within a video conferencing solution.

DETAILED DESCRIPTION

Figure 1:
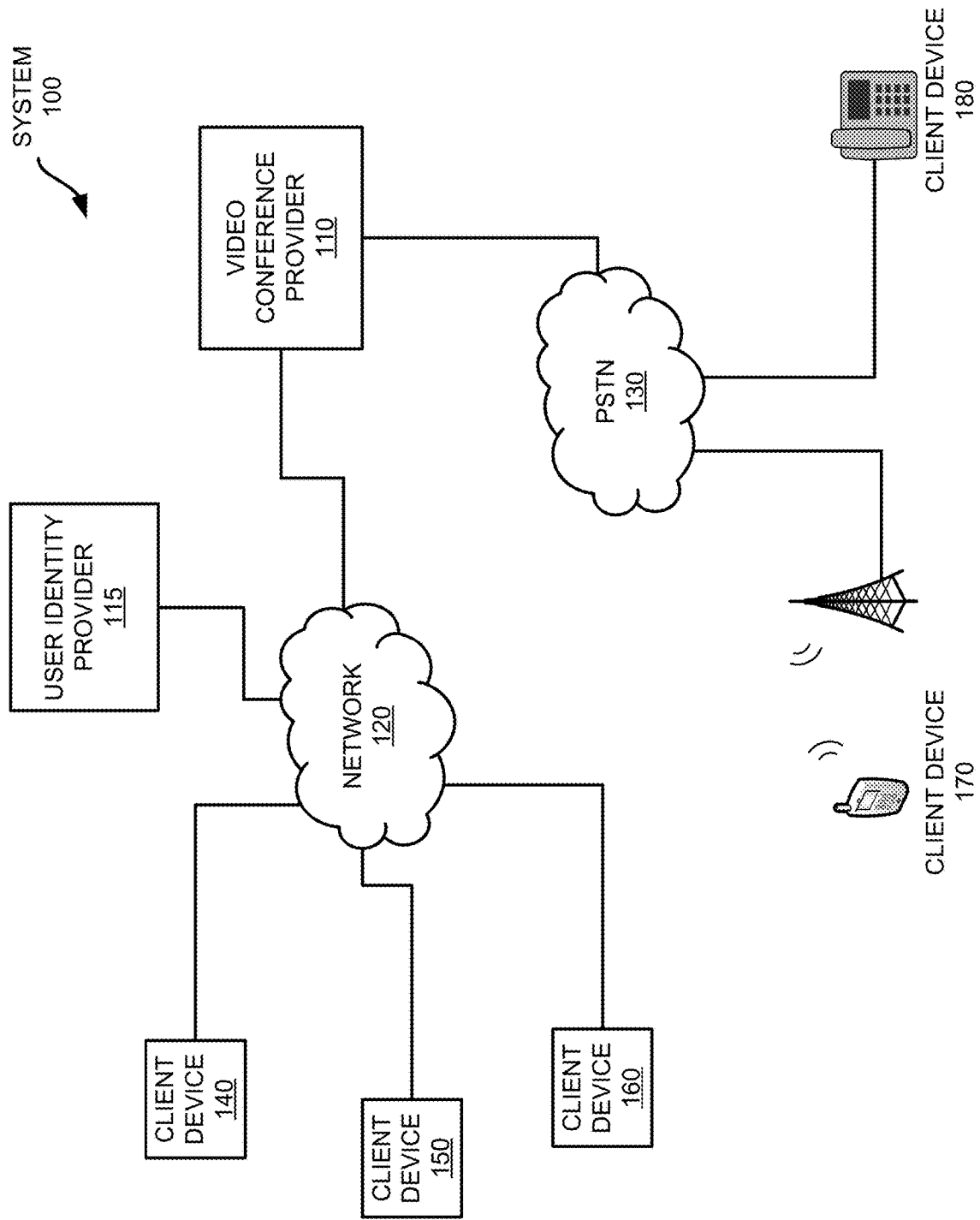
FIG. 1 is an illustration depicting an example video conferencing system in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to systems and methods that provide a mechanism to recommend and enable access to the collaborative content within the video conferencing solution.

Conference participants frequently share content from their computer with other participants on other computers during a conference. Shared content can include any combination of information displayable on their computer, such as applications from their desktop display, documents, or presentations. The shared content can include collaborative content, such as documents from a web-based document editor suite, that can be accessed using a web browser on each of the respective computers. However, to access certain collaborative content, such as web-based content provided through a web browser, the users need to navigate away from the video conferencing solution. The present disclosure provides systems and methods in which users can access the same content using a native application within the video conferencing solution during the conference. Accessing the collaborative content within the video conferencing solution would allow for seamless interaction within the video conferencing solution itself, rather than switching between the video conferencing solution, and the shared content outside of the conferencing solution.

In accordance with embodiments of the present disclosure, the video conferencing solution can detect when a user is attempting to share content for collaborative when sharing their screen within the video conferencing solution. The video conferencing solution can determine if there is a corresponding application integrated within the video conferencing solution that can provide access to the collaborative content without leaving (e.g., accessing a separate application) the video conferencing solution. If there is a corresponding application, the video conferencing solution can suggest that the user access the collaborative content using the corresponding application within the video conferencing solution. Suggesting use of the corresponding application within the video conferencing solution may be preferable to provide a streamlined interaction between users, such that users do not need to navigate between two different applications while interacting via a video conference. This may increase the ability of the users to follow along with the meeting as well as the collaborations without additional distractions by having manually swap between applications. Thereafter, the corresponding application can be launched within the video conferencing solution or the video conferencing solution can prompt the user to install the corresponding application, which can then be launched to access the shared content. The systems and methods of the present disclosure provide an improved collaboration between remote users, and more particularly, to providing a platform for recognizing and enabling users to collaborate within a video conferencing solution.

System Overview

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2A:
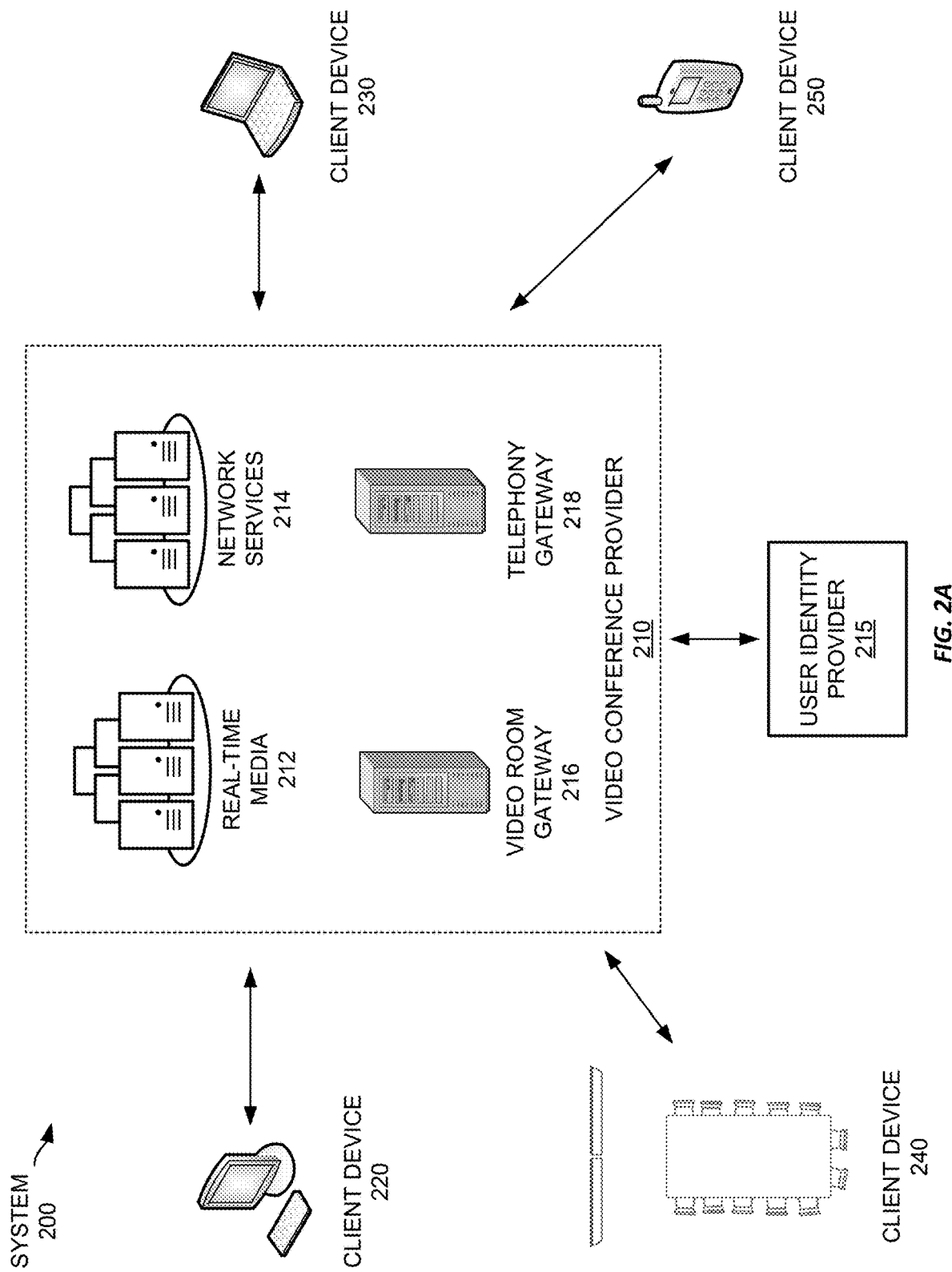
FIGS. 2A and 2B are illustrations depicting an example video conferencing system in accordance with various embodiments.

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2A, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2A, FIG. 2A shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2A. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 2B:
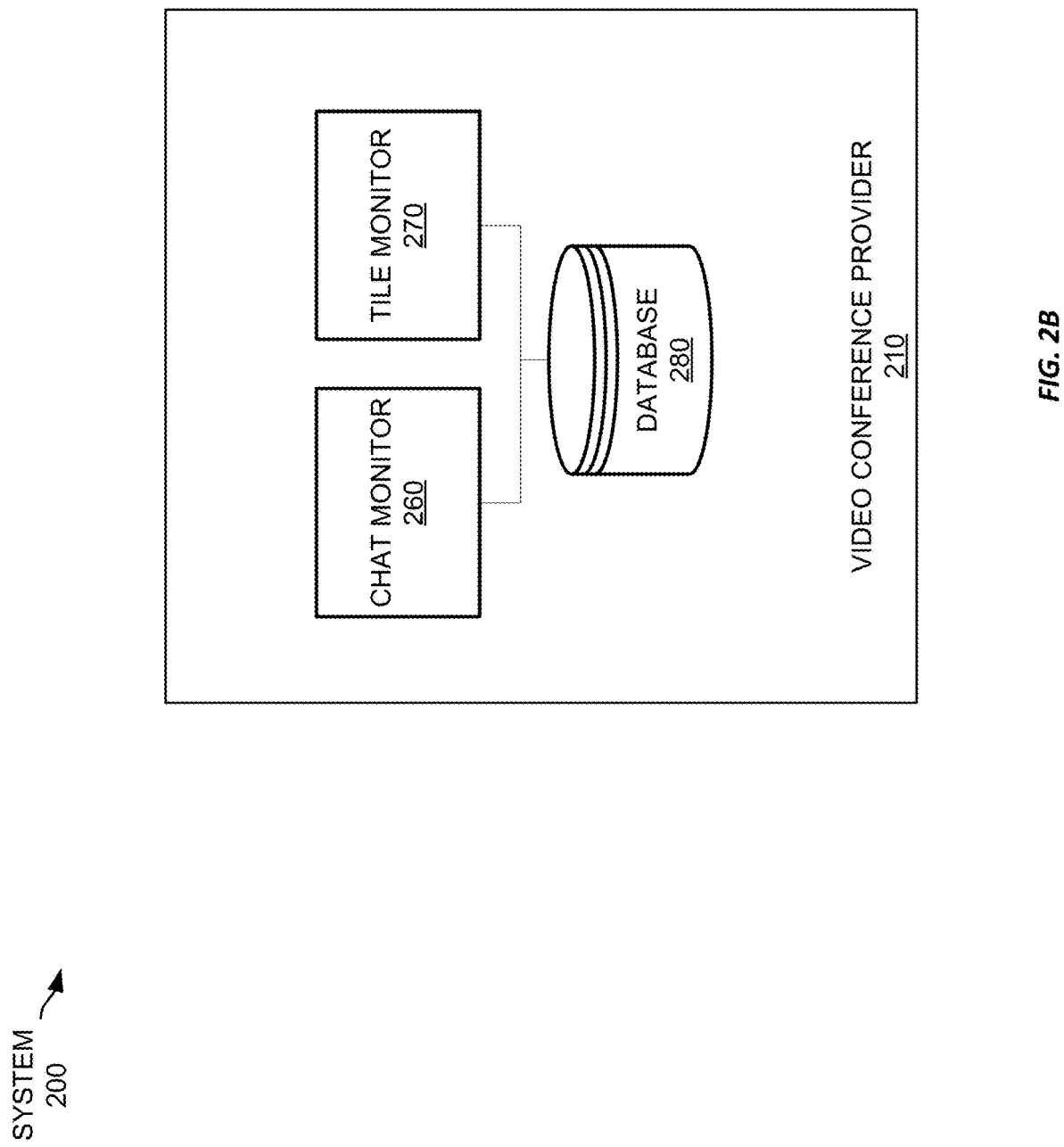

Referring now to FIG. 2B, FIG. 2B shows an example diagram depicting example components for the video conference provider 210, for use in accordance with the present disclosure. The video conference provider 210 can include a chat monitor 260 and a shareable window monitor 270. In some embodiments, the chat monitor 260 can be configured to monitor and track user input into a chat (e.g., window 326 and chat text entry area 328) of a video conferences solution to identify text that indicates that a user is looking to collaborate using one or more collaboration platforms. For example, the chat monitor 260 can monitor chat to identify when a user enters a uniform resource language (URL) address to a collaboration platform or shared content. The URL address may be shared within chat to enable other participants to access the link to join in a collaborative session. In another example, the chat monitor 260 can monitor chat to identify when a user clicks on a URL address linked to a collaboration platform.

The collaboration platforms can include any combination of applications, web-based application, or other solutions that provide collaborative environments for users to interact with one another and on the same files, whiteboard, etc. Examples of collaboration platforms include, but are not limited to, Miro™, Google™ Docs, Asana™, DropBox™, Mural™, whiteboards, InVision™, Figma™, Coda™, etc. Each of these example collaboration platforms can include a web-based application associated with a URL address accessible through a web browser as well as corresponding applications integrated within the video conference solution (e.g., native applications to the video conferencing solution).

The chat monitor 260 can utilize any combination of text processing to identify text that indicates that a user is looking to collaborate. For example, the chat monitor 260 can use a combination of text parsing, natural language processing, link unfurling to provide a simple preview, etc. The chat monitor 260 can be configured to compare user input to inputs associated with known and/or registered collaboration platforms. For example, when a user entered a URL address, keyword/phrase, etc. into a chat, the chat monitor 260 compares the user entered URL address, keyword/phrase, etc. to a list of URL address, keyword/phrase, etc. associated with known and/or registered collaboration platforms. The comparison can be performed using any combination of systems and methods. For example, the comparison can be performed using data stored within a database (e.g., database 280), table, or other data structure. In some embodiments, the collaboration platforms can be register with the provider of the video conferencing solution and provide a list of regular expression for URLs associated with their platforms.

In some embodiments, when the chat monitor 260 identifies text that indicates that a user is attempting to collaborate using one or more collaboration platforms, the chat monitor 260 can trigger subsequent action. The subsequent action can include the chat monitor 260 triggered a process for notifying a user that a native application, associated with the collaboration platform, within the video conferencing solution is available for use, as discussed in greater detail herein. For example, if a user shares a URL address to Miro.com, the chat monitor 260 can compare the URL address of Miro.com to URLs associated with a list of available native application to determine that a native application for Miro exists within the video conferencing solution. Thereafter, the native Miro application can be launched or suggested to be launched instead of opening a web browser, outside of the video conferencing solution, to access Miro web-application within the web browser.

In some embodiments, the shareable window monitor 270 can be configured to monitor and track user input as part of a share screen operation (e.g., main viewing area 302 and control 318) to identify interactions within a graphical user interface (GUI) that indicates that a user is attempting to share content associated with one or more collaboration platforms. The interactions can include any combination of actions that a user may make when attempting to share content. For example, the interaction can include user activation of the control 318 to enter presentation mode to share a screen having a selection of content to be shared within the main viewing area 302. The selection of content can include content to be presented to other users, which the user may intend to be for collaboration purposes. The shareable window monitor 270 can use context from the available shareable windows 332 to determine whether the user is attempting to share content from an application or a tool designed for collaboration. In some embodiments, the monitoring for the attempt to share includes detection of a selection of a shareable window, where the shareable window is associated with a collaboration platform. The identification of a collaboration platform can be performed using any combination of methods. In some embodiments, identification of a collaboration platform is performed through the detection a uniform resource locator (URL) address within meta data associated with the shareable window 332.

The shareable window monitor 270 can utilize any combination of data processing methods to determine that a user is looking to collaborate, based on the user's selection of one or more shareable windows 332. In some embodiments, the shareable window monitor 270 can extract and analyze a title, URL address, meta data, etc. from one or more available shareable windows 332 to identify which screens or shareable windows 332 are associated with a collaboration platform. The shareable window monitor 270 can be configured to compare meta data associated with selectable shareable windows 332 with meta data and/or information for known collaboration platforms to determine if there is a match. For example, if website/xyzdoc is open in a web browser when the user selects the share screen control 318, the shareable window monitor 270 can extract the URL from the open browser. When the shareable window monitor 270 identifies meta data within a selected screen to share matches meta data associated with known collaboration platforms, then it is determined that the user is attempting to collaborate using the collaboration platform within the shareable window (or share screen). For example, the URL is parsed and compared against known and/or registered URLs for collaboration platforms. The title, URL address, meta data can include any combination of data that is obtainable by the video conference provider 210. Similarly, the comparison can be performed using any combination of systems and methods. For example, the comparison can be performed using data stored within a database (e.g., database 280), table, or other data structure. When the shareable window monitor 270 identifies title, URL address, meta data, etc. that indicates that a user is looking to collaborate using one or more collaboration platforms, the shareable window monitor 270 can trigger subsequent action. For example, the shareable window monitor 270 can trigger a process for notifying a user that a native application associated with the collaboration platform, within the video conferencing solution, is available for use, as discussed in greater detail herein.

In some embodiments, each of the chat monitor 260 and the shareable window monitor 270 can be configured to derive additional information from content being shared, after determining that a user is looking to collaborate on the content using one or more collaboration platforms. The additional information can include extracting the specific workspace or file that the user is intending on accessing though a collaboration platform. For example, if a user is trying to access a specific document for collaboration within a collaborative word processor web-application, the chat monitor 260 and/or the shareable window monitor 270 can identify the specific document location. Once the specific workspace or file is identified, the chat monitor 260 and/or the shareable window monitor 270 can use that information to retrieve and load the workspace or file in the appropriate native collaborative application within the video conferencing solution. Each of the chat monitor 260 and the shareable window monitor 270 can obtain the workspace or file information using any combination of methods.

Figure 5:
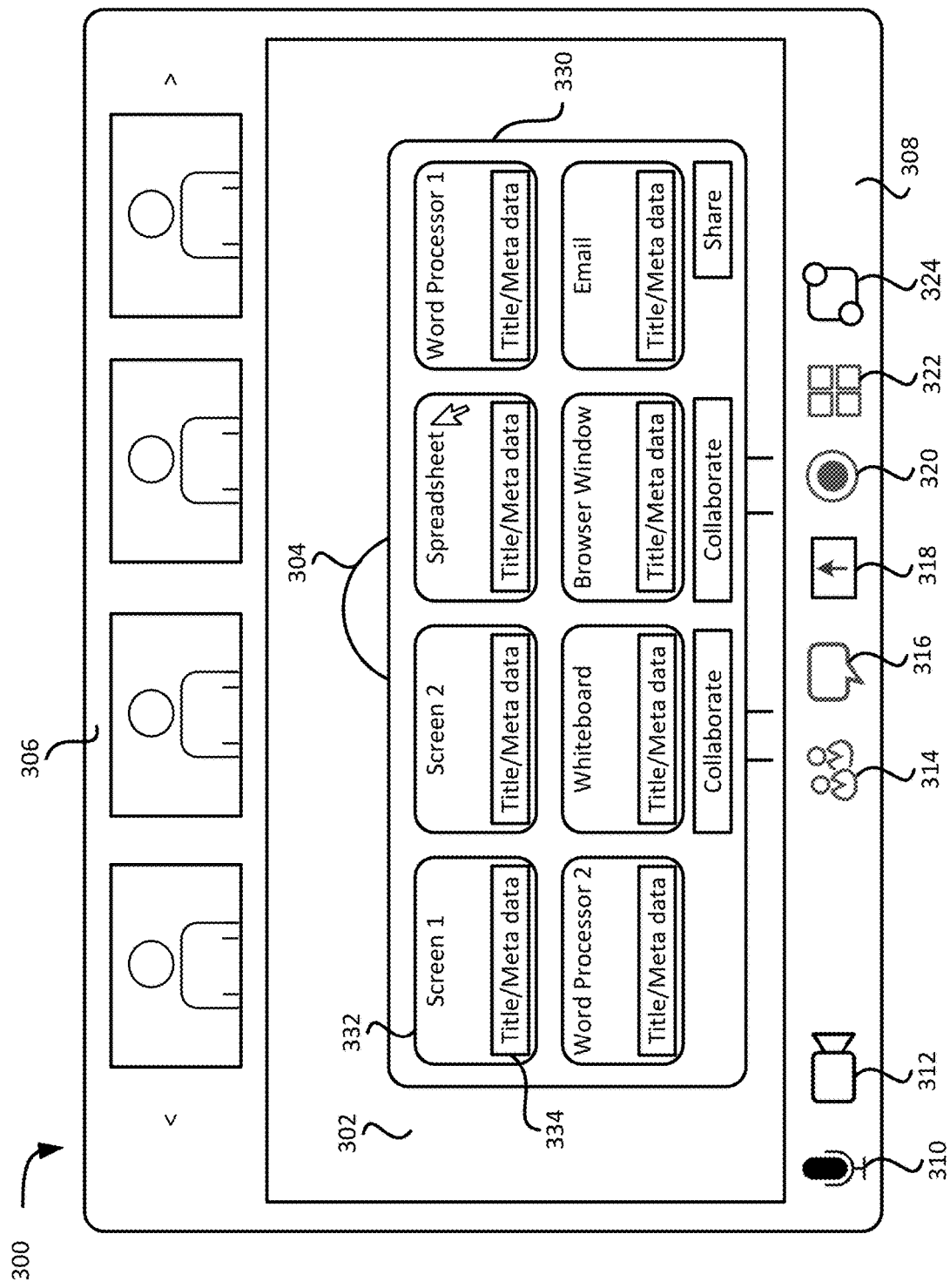
FIG. 5 is an illustration of an example graphical user interface ("GUI") in accordance with various embodiments.
Figure 6:
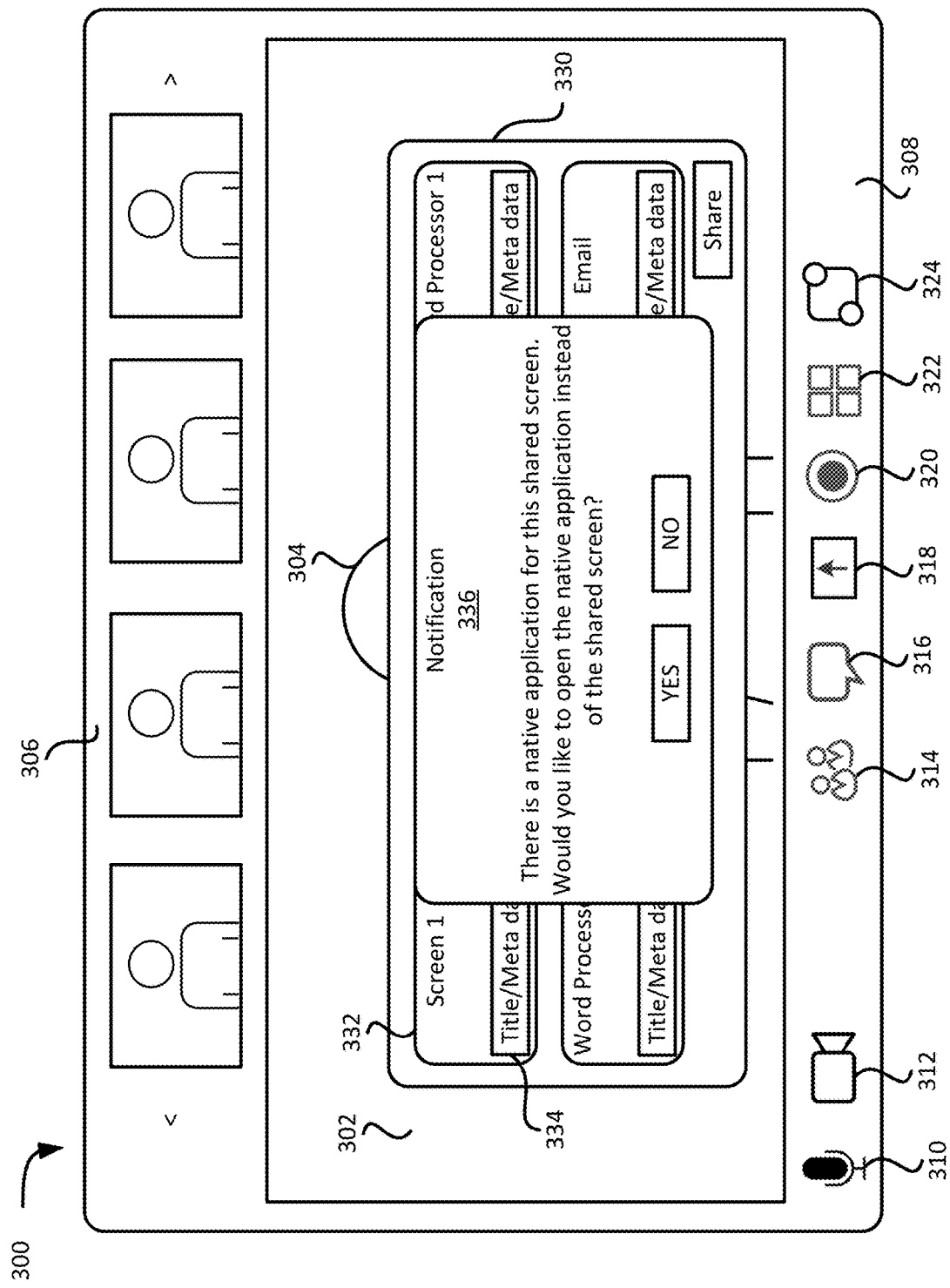
FIG. 6 is an illustration of an example graphical user interface ("GUI") in accordance with various embodiments.

In some embodiments, the chat monitor 260 and/or the shareable window monitor 270 can obtain the workspace or file information by parsing a URL address. For example, after identifying a URL address entered into the chat window 326 (or pulled from a shareable window 332), a parser can be used to identify the domain (or subdomain) from the link, and identify the workspace or file location from the link. For example, as shown in FIG. 5, the a domain of "collaborate" and the workspace or file of "filename.html" can be parsed from the URL of www.collaborate.com/filename.html. In another example, as shown in FIG. 6, the shareable window monitor 270 can identify a URL within the title and/or meta data (e.g., data field 334) associated with the selected shared screen. In either example, the domain of "collaborate" can signify the source for the collaboration platform and the "filename.html" can represent the workspace or file. Thereafter. the workspace or file can be download from the URL address (www.collaborate.com/filename.html) or it can provide the URL (or portions thereof) to the native application within the video conferencing solution for retrieval or access.

In some embodiments, the video conferencing solution coordinate with collaboration platforms to understand how the collaboration platforms structure their URLs, both on the web and within the native application. This may be important because the URL for a given document within their native application may be different than the URL for that same document on the Internet. Using the URL structure, the video conferencing solution can create regular expressions that reflect the correct structure for the web address URLs and the native application URLs. Using the expressions, the video conferencing solution can parse the URL from chat or on a Shareable window and match it with a native application. The regular expression will also allow the video conferencing solution to read the document location from the URL and link users to the correct document location within the native application.

In some embodiments, the video conference provider 210 can include or otherwise be communicatively coupled to a database 280. The database 280 can include any combination of data for operating the various aspects of the present disclosure. For example, the database 280 can include data needed for the chat monitor 260 and the shareable window monitor 270 to function in making determinations as to whether a user is attempting to collaborate using a collaboration platform. The data used by the chat monitor 260 and the shareable window monitor 270 can include a data related to collaboration platforms that have native applications associated with the video conference provider 210. For example, the video conference provider 210 can be configured with a plurality of third-party applications that can run within the video conferencing solution itself.

The data related to collaboration platforms can include any combination of data that is useful in identifying when a user is trying to access the collaboration platforms outside of the video conferencing solution (e.g., by accessing a web-based application, a third-party application for the collaboration platform, etc.). For example, the data can include frequently used titles for the collaboration platform, links (e.g., URL) associated with the collaboration platform, web domains, meta data for the collaboration platform, etc. The data can also include references or links to other information related to the native collaboration platforms. In some embodiments, when adding a new native application to the video conferencing solution, information associated with the native application can also be registered within the database 280. For example, information related to a title, application name, URL address, application type (e.g., collaborative or not), etc. can be associated with the native application. This information can then be used later to identify a collaborative platform associated with content being shared by a user and then provide redirection to the native application associated with the collaborative platform.

Figure 3:
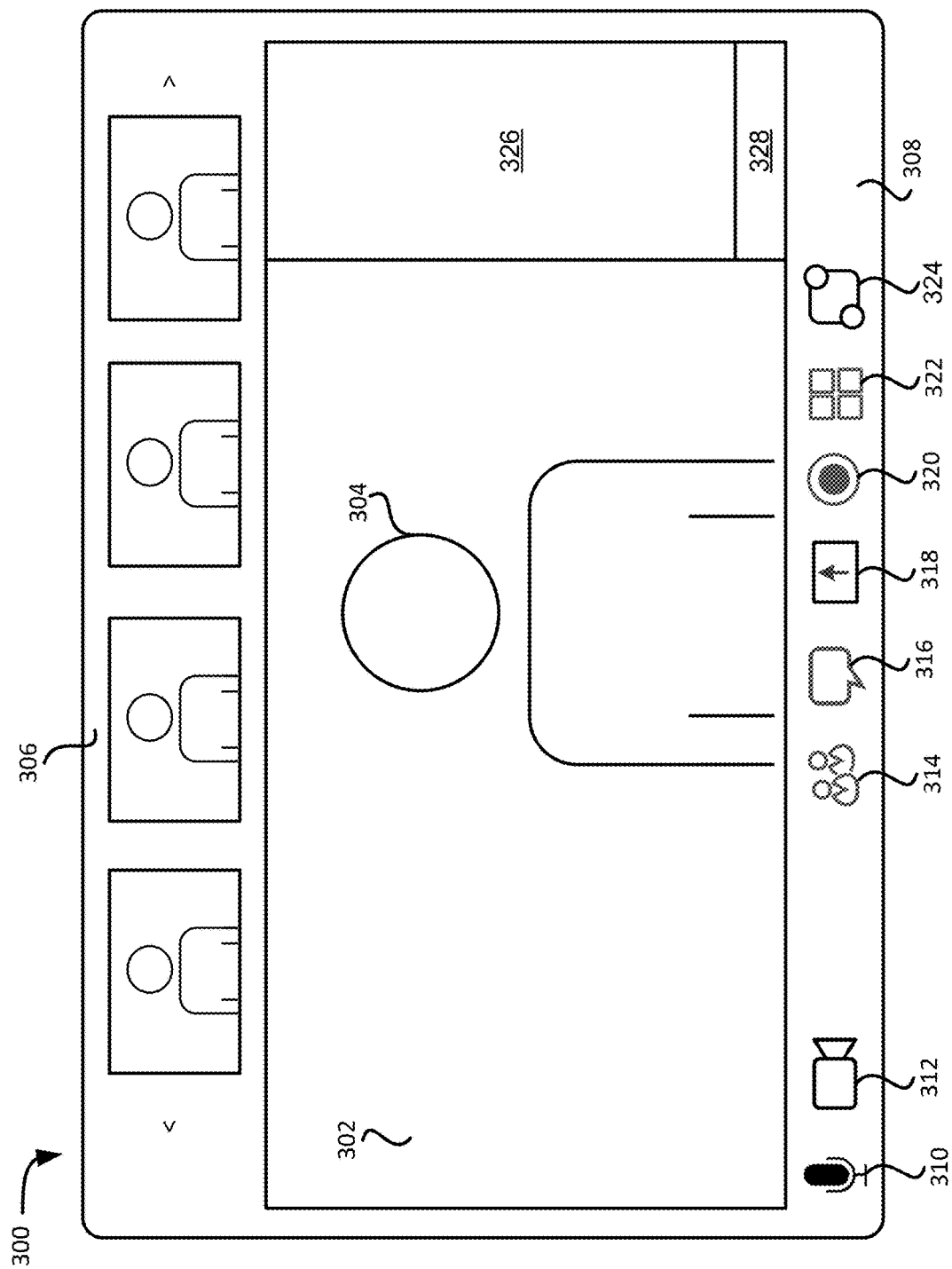
FIG. 3 is an illustration of an example graphical user interface ("GUI") in accordance with various embodiments.

Referring now to FIG. 3, FIG. 3 shows an example graphical user interface (GUI) 300 that a user's (or participant's) client device may display while interacting with another participant during a virtual meeting in a conversation. A client device, e.g., client devices 220-250, executes video conferencing software, which in turn displays the GUI 300 on the client device's display. In this example, main viewing area 302 may display various images, depending on the configuration of the GUI 300 chosen by the videoconference participant. In this example, main viewing area 302 is displaying an image of the current or active speaker 304 in a videoconference. The GUI 300 also includes a gallery strip 306. Gallery strip 306 displays thumbnail images of the most recent speakers in the videoconference. The GUI 300 also includes a toolbar 308 that includes various user controls 310-324, as examples, controls for video devices, microphones, chat functions, gesture functions, and recording functions. Controls 310, 312 may allow the participant to toggle on or off audio or video streams, respectively, captured by a microphone or camera connected to the client device. Control 314 allows the participant to view any other participants in the video conference with the participant, while control 316 allows the participant to send text messages to the other participants. Control 318 allows the participant to share content from their client device. Control 320 allows the participant to toggle recording of the meeting, and control 322 allows the user to select an option to join a breakout room, though in this example, with only two participants, breakout room functionality may be disabled. Control 324 allows the participant to toggle various applications that may be integrated with the video conferencing software. The GUI 300 also includes a chat window 326 and chat text entry area 328, which may be toggled by control 322, to allow the participants to exchange text messages.

Figure 4:
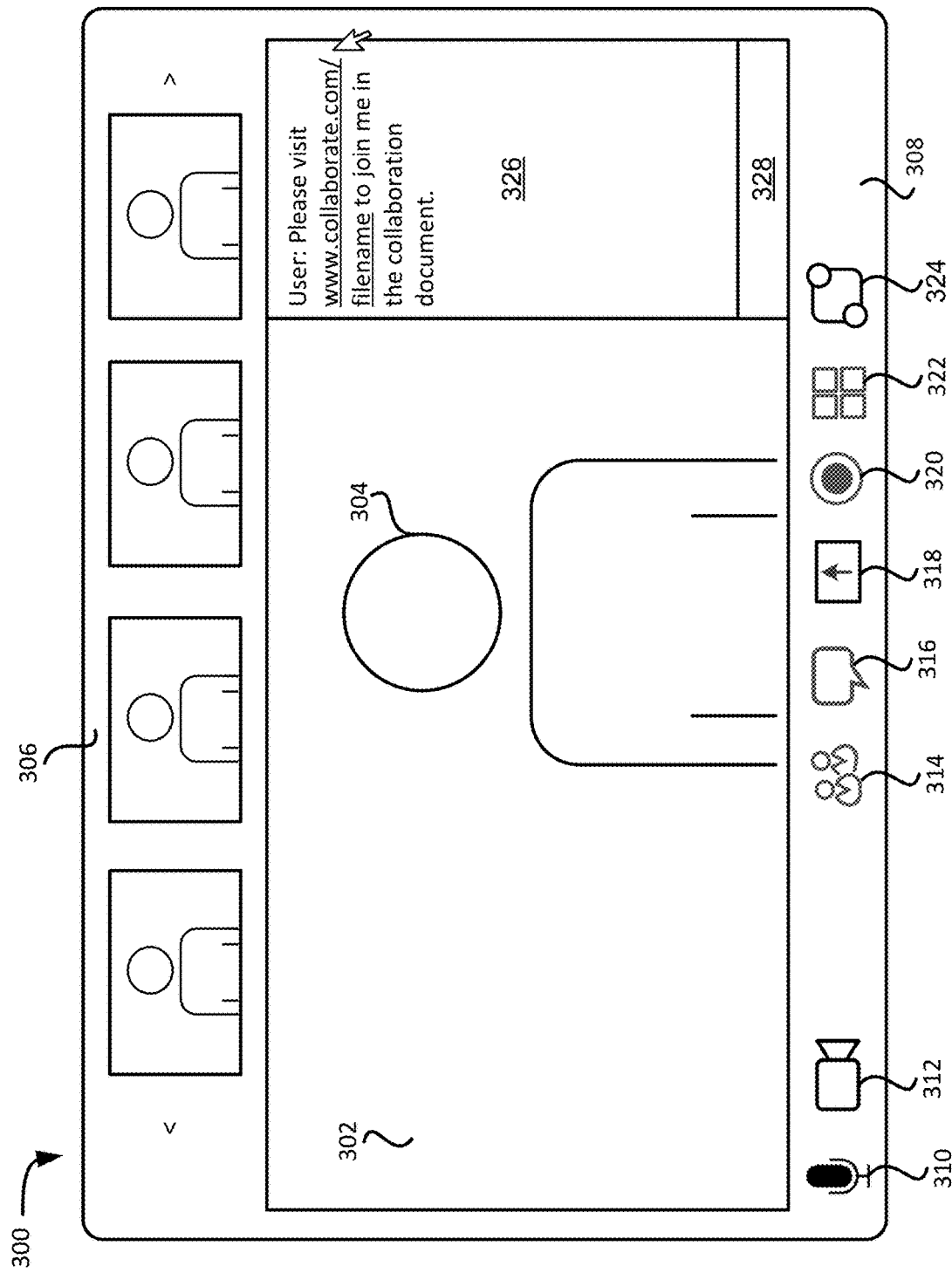
FIG. 4 is an illustration of an example graphical user interface ("GUI") in accordance with various embodiments.

Referring now to FIG. 4, FIG. 4 shows an example graphical user interface (GUI) 300 that shows an interaction with a participant's client device to anticipate a user's intent to collaborate while using the GUI 300. Specifically, FIG. 4 shows a user's interaction with the chat window 326 and chat text entry area 328, causing the chat monitor 260 to determine that the user is attempting to launch a collaboration platform outside of the video conferencing solution. The chat monitor 260 can attempt to launch a collaboration platform as discussed with respect to FIG. 2B. For example, as shown in FIG. 4, when a user enters a URL address in the chat window 326 the chat monitor 260 can analyze the text being entered and identify the URL as a potential collaboration link. The chat monitor 260 can compare the domain of the URL against saved URLs associated with notice applications to determine if there is a native application associated with the URL. In some embodiments, entry of a URL address matching a native application can cause a notification 336 to pop up, notifying the user that a native application for the desired collaboration platform is available to be launched.

Referring now to FIG. 5, FIG. 5 shows an example graphical user interface (GUI) 300 that a participant's client device may display while sharing their screen and/or an application(s). In some embodiments, in response to selecting the control 318, a sharing window 330 can be opened. The sharing window 330 can include a plurality of selectable shareable windows 332 to be shared within the main viewing area 302 of the GUI 300. The selectable shareable windows 332 can be populated based on the available screens, applications, etc. that are running on the client device and/or hardware elements provided by the client devices. For example, as depicted in FIG. 5, the sharing window 330 can include selectable shareable windows 332 for a first screen (e.g., first monitor), a second screen (e.g., second monitor), a whiteboard application, a first window for an open word processor application, a second window for the open word processor application, a window for an open spreadsheet application, a browser window, and an email window. In some embodiments, each of the selectable shareable windows 332 can include a data field 334 including information about the selectable shareable window 332. For example, each of the selectable shareable windows 332 can include information, such as, title tags, meta data, URL, etc. associated with the application being populated within the selectable shareable window 332. In some embodiments, the type of program associated with the selectable shareable windows 332 can dictate the sharing mode such that each of the selectable shareable windows 332 can be configured for either presentation mode and/or collaboration mode. For example, selection of the screen 1 would be a view only mode, whereas selection of the whiteboard can be a shared read/write access mode.

In some embodiments, selection of one of the selectable shareable windows 332 will cause the GUI 300 to display the source of the selectable shareable window 332 within the main viewing area 302. For example, if the user selects the browser window selectable shareable window 332, the main viewing area 302 will be updated to show the active browser on the client computer. In some embodiments, as depicted in FIG. 5, the sharing window 330 can include a share button which can be used to change the main viewing area 302 after selection of one of the selectable shareable windows 332.

In some embodiments, the control 318 can include multiple different sharing modes. For example, the control 318 can include selections for a presentation mode and a collaboration mode. Presentation mode can be configured to provide a shared content from one client device to the other client devices in a manner in which the other client devices follow along with the interactions on the one client device. In contrast, collaboration mode can be configured to provide shared content to all of client devices in a manner in which all of client devices can interact with the shared content. In other words, in presentation mode, the non-sharing participants can only view the shared content, whereas in collaboration mode all of the participants can view and interact with the shared content.

The different sharing modes can be represented by separate buttons (e.g., one for presentation mode and one for collaboration mode) and/or can be selected as part of activation of the control 318, for example, via a drop-down menu. Depending on which of the sharing modes that are selected, the main viewing area 302 will be updated to share different information. For example, if presentation mode is selected, the selection of one of the selectable shareable windows 332 will cause the GUI 300 to display the view from the client device, which cannot be interacted with by other users in a meeting, other than viewing. In another example, if collaboration mode is selected, the selection of one of the selectable shareable windows 332 will cause the GUI 300 to display the view from the client device, which can be interacted with by other users in a meeting.

Referring now to FIG. 6, FIG. 6 shows an example graphical user interface (GUI) 300 that shows a notification 336 being displayed by the GUI 300 in response to one of the user's actions (e.g., selecting one of the shareable windows 332 or entering a URL address in a chat window 326). The notification 336 can alert the user to the fact that a native application (associated with the selected collaboration platform) exists for enabling collaboration within the video conferencing solution, without having to leave the video conferencing solution for the collaboration platform located outside of the video conferencing solution. In some embodiments, the notification 336 can include options for proceeding to launch (or install) the native application or to deny and proceed to the originally intended collaboration platform situated outside of the video conferencing solution. Although an example of the notification 336 is depicted as a pop-up, as depicted in FIG. 6, the notification 336 can be presented in any combination of manners. For example, the notification 336 can be provided as a call-to-action to be embedded within the sharing window 330 below the data field 334 and/or embedded within the chat window 326 as an automated message below the message containing the URL.

Figure 7:
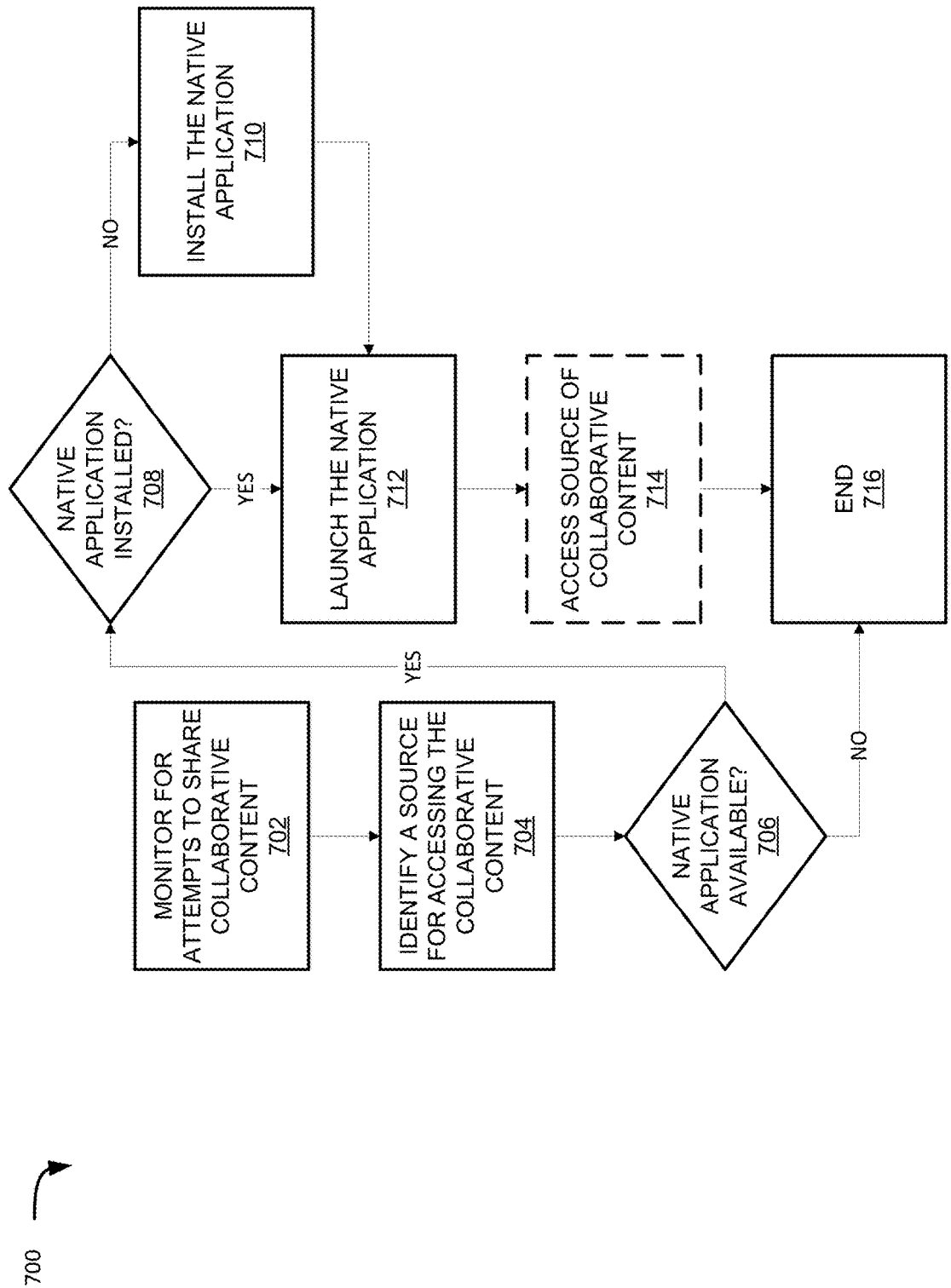
FIG. 7 is a flow chart depicting a process for using a reference in accordance with various embodiments.

Referring now to FIG. 7, FIG. 7 shows an example method 700 for tracking interactions during a virtual meeting within a video conferencing solution. The process 700 of FIG. 7 will be described with respect to the system 200 shown in FIGS. 2A and 2B, however, any suitable system according to this disclosure may be employed. Initially, a virtual meeting within a video conferencing solution, hosted by the video conference provider 210, is started with two or more participants (or users). For example, the system 200 is used to start a virtual meeting between participants using a combination of client devices 220-250. Once a virtual meeting has been launched, the process 700 can be started. For example, the GUI 300 can be launched and used by the participants.

At block 702, the process 700 monitors for an attempt to share content, by one or more of the users, through the graphical user interface (GUI) of the virtual meeting. Identifying an attempt to share content can include any combination of mechanisms, for example, monitoring user interactions with the GUI for actions that are associated with attempts by one or more of the participants to share content. In some embodiments, any combination of the chat monitor 260 and the shareable window monitor 270 can monitor user interactions (e.g., via client devices 220-250) within a virtual meeting. For example, the process 700 can monitor the user's interactions with any combination of the main viewing area 302, the controls 310-324, and the chat window 326 and chat text entry area 328 within the GUI 300. In some embodiments, to identify attempts to share content on collaborative platform, the process 700 monitors user interactions with the chat 326, 328 (e.g., via chat monitor 260) and the plurality of shareable windows 332 (e.g., via the shareable window monitor 270). When certain interactions are detected (e.g., by one of the chat monitor 260 and the shareable window monitor 270) within the GUI 300, those interactions can trigger block 704. Specifically, the process 700 monitors for a user's attempt to share content and then determines whether the content being shared is through a collaborative platform.

At block 704, the process 700 determines the manner that the user is attempting to share content through. The user can be attempting to share content through a presentation mode or through a collaboration mode. The user can select one of the presentation mode or the collaboration mode or the process 700 can determine which mode the user intends to use or should be using. In some embodiments, determining the mode can include determining the source providing the content. The source that the user is attempting to share content through can be determined using any combination of techniques. In some embodiments, the source can be determined using one of the chat monitor 260 and the shareable window monitor 270, as discussed with respect to FIG. 2B. For example, the chat monitor 260 can monitor if a user enters a URL into the chat and the shareable window monitor 270 can monitor if a user selects a shareable window 332 to be shared in a presentation mode. In some embodiments, the process 700 can include checking whether the source of the shared content offers a collaboration mode. For example, the user can attempt to share a link or share a screen for a web-based application at a URL address hosting a collaboration tool. Using the URL, the process 700 can extract the domain and document location, for example, matching the URL with a list of regular expressions for URLs. If there's a match, then it can be determined that a user is trying to access a collaborative tool outside of the video conferencing solution. This identification can trigger call to action to collaborate mode rather than sharing via presentation mode. In some embodiments, the meta data including the URL address associated with the shared screen for the application or a URL address entered in chat can be extracted to identify a source of the shared content.

At block 706, once the source of the shared content is identified as a collaboration platform, a determination is made as to whether a native application corresponding to the source collaboration platform exists as an application contained within the video conferencing solution. The determination can include comparing an identifier of the source collaboration platform to a list of identifiers for known collaborative platform sources. In some embodiments, the identifier can include domain name of a URL address associated with the shared screen, which can be compared to identifiers associated with the native application names that have been integrated with the video conferencing solution. The identifier can include any combination of information and/or data. For example, the identifier can include a combination of title tags, meta data, URL, etc. Similarly, in some embodiments, meta data can be compared against data associated with native application names that have been integrated with the video conferencing solution. If there is not a matching native application, then the process 700 ends at block 716, or returns to block 702 to continue monitoring for future sharing events. If there is a matching native application, then the process 700 advances to block 708.

At block 708, if the identified collaboration platform matches one of the application names that have been integrated with the video conferencing solution (native applications), a determination is made as to whether the native application is currently installed on the client device(s) 220-250 participating in the virtual meeting. If the native application is not installed, then the process 700 advances to block 710 to prompt and/or initiate installation of the native application on one or more of the user's client devices.

At block 710, the process 700 installs the native application within the video conferencing solution on the client device. In some embodiments, the native application is an application that is designed and optimized to run within the framework of the video conferencing solution. The installation can be performed using any combination of methods. For example, the installation can be performed in response to receiving instructions from a user to perform the installation. The installation can include activating a previously downloaded application within the video conferencing solution or downloading the application and loading it into the video conferencing solution.

Returning to block 708, if the native application is installed, then the process 700 advances to block 712. At block 712, in some embodiments, the process 700 launches collaboration mode. Collaborate mode is a shared experience that allows all meeting participants to work on the same document within a native application. In some embodiments, collaboration mode launches the native application and optionally launches the collaborative document within the native application. The native application can be launched in place of the originally intended operation selected by the user. For example, if the user selected a share screen for a web-based application (corresponding to the native application), that is outside of the video conferencing solution, this operation would be circumvented by launching the native application. In another example, if a user selected a URL for a web-based application to be loaded in a browser (e.g., from chat), this operation would be circumvented by launching the native application instead. In some embodiments, any user who clicks the URL link within chat can cause the collaborate mode experience for all participants. In some embodiments, if the user is trying to share a specific document within a web-based application or URL, then the native application will be launched while also directing the user to the same document that they were planning to share.

In some embodiments, prior to launching the application, the process 700 triggers a notification 336 to the user indicating that a native application within the video conferencing solution is available for use, as shown in FIG. 7. The notification 336 can be provided to convey to the user that a native application exists for the shared content and provides a simplified means to direct the user to the native application. In some embodiments, the notification 336 can be provided to the user before the attempted sharing operation initiated by the user is completed, such that the notification 336 can provide the user an opportunity to use the native application instead of the originally intended shared collaboration method. In some embodiments, the notification 336 can be replaced by a call to action to access the native application (e.g., within sharing window 330). For example, the GUI 300 can include a "Collaborate in Native Application" button below one of the available shareable windows 332, as shown in FIG. 5. The collaboration buttons can be provided under any of the shareable windows 332 that include a native application for collaboration. For example, as shown in FIG. 5, both Whiteboard and the URL within the Brower shareable windows 332 are available for native application collaboration. This approach allows the user to open the application instead of sharing their screen. This may make the experience less jarring because it does not interrupt the sharing process.

If the user elects not to use the native application, the process will continue the original intended shared operation (e.g., following web-based URL or share screen of a separate application). If the native application is not launched, the process 700 can advance to block 716 and/or block 702. If the user elects to use the native application, instead of following the original intended shared operation (e.g., following web-based URL or share screen of a separate application), the process 700 launches the native application within the video conferencing solution. Launching the native application can be performed using any combination of methods. For example, the native content sharing application can be launched within the main viewing area 302 of the GUI 300. Once launched the participants can collaborate using the native content sharing application within the video conferencing solution. If the native application is launched, the process 700 can optionally advance to block 714 and/or block 716/702.

At block 714, the process 700 can optionally identify one or more workspaces or files that were intended to be shared by the user within the collaboration platform. For example, the process 700 can pull workspaces or files from URL address or web-based application. For example, as discussed in greater detail herein, block 714 can include grabbing the URL and matching it against a list of regular expressions for URLs to identify domains associated with native applications as well as the correct location of the document. The matching algorithm will allow the video conferencing solution to direct the user to the right document within the native application.

At block 716, the process 700 ends or returns to block 702 to continue monitoring for attempts to share collaborative content. The process 700 provides a method in which video conferencing solutions can incorporate a collaboration environment into same screen as the virtual meeting being hosted. Adoption of video conferencing solutions implementing the present disclosure can change user habits such that they are trained to use native applications within the video conferencing solution instead of relying on third-party applications located outside of the video conferencing solution. The native applications are applications that live within the video conferencing solution, instead of redirecting participants to collaboration platforms located outside the video conferencing solution, which provides for a smoother collaborative environment. Additionally, native applications have access to data and events that take place within the video conferencing solution and, therefore, can offer elevated experiences that aren't possible outside of the video conferencing solution. For example, a native app can detect the names of each user, can see the active speaker, can see if someone mutes/unmutes, etc. The data and events available to native applications allow the applications to offer a superior experience that is tightly coupled with the video conference experience. In some embodiments, native applications can leverage the credentials and authentication of the video conferencing solution users and can use this to automatically log users into the native applications. Similarly, native applications can display the cursors of everyone in the meeting so users can see what others are doing and follow along with the meeting leader.

While the operations of process 700 is described as being performed by the systems 100, 200, it should be understood that any suitable device may be used to perform one or more operations of this process. Process 700 (described above) is illustrated as a logical flow diagram which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the process 700. Additionally, any combination of the blocks provided in process 700 can be performed by any combination of components within the systems 100, 200. For example, the blocks can be performed entirely by a server, a client device, or a combination thereof.

Figure 8:
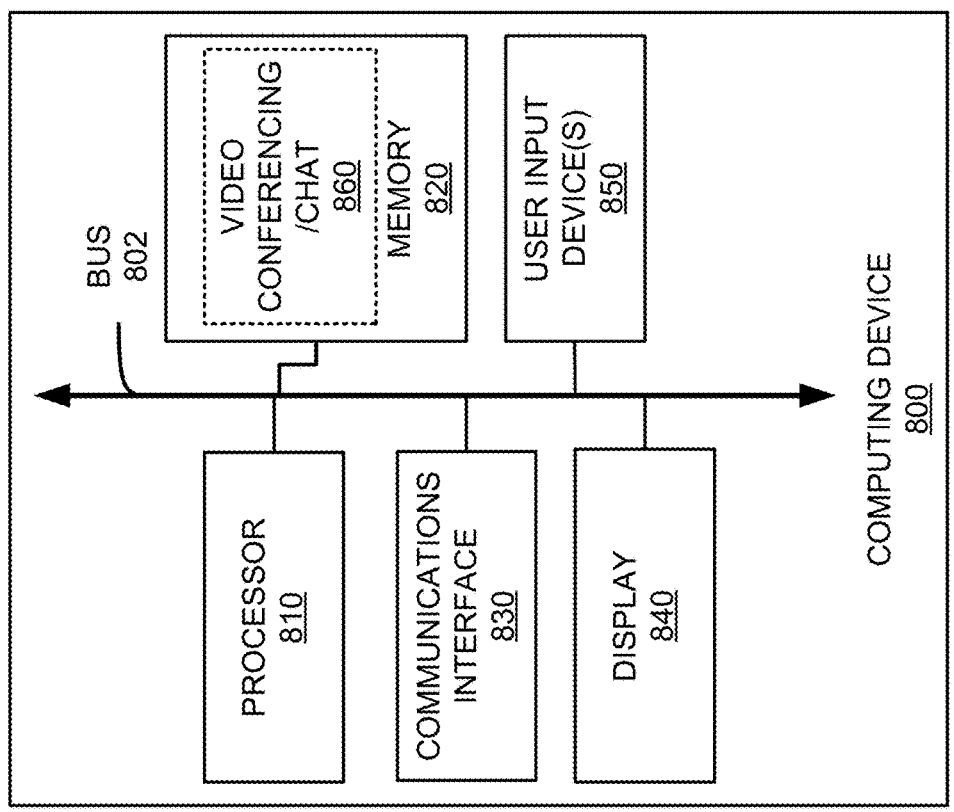
FIG. 8 shows an example computing device suitable for use with systems and methods in accordance with various embodiments.

Referring now to FIG. 8, FIG. 8 shows an example computing device 800 suitable for use in example systems or methods for participant interactions during a virtual meeting according to this disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods according to different examples, such as part or all of the example method 700 described above with respect to FIG. 7. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes a video conferencing application 860 to enable a user to join and participate in a video conference, such as a conventional meeting or webinar, by receiving multimedia streams from a video conference provider, sending multimedia streams to the video conference provider, joining and leaving breakout rooms, engaging in participant interactions during a virtual meeting, etc. such as described throughout this disclosure, etc.

The computing device 800 also includes a communications interface 840. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method for launching a collaborative application, the method comprising:
    starting a virtual meeting, within a video conferencing solution, between at least a first user and a second user;
    monitoring for an attempt to share content through a graphical user interface for the virtual meeting;
    determining that the first user is attempting to show the shared content to the second user through a collaboration platform that is separate from the video conferencing solution;

identifying a native application associated with the collaboration platform and integrated with the video conferencing solution;
notifying the first user that the native application is available for collaboration within the virtual meeting; and
launching the native application within the virtual meeting.

2. The method of claim 1, further comprising:
determining that the native application is not installed within the video conferencing solution; and
installing the native application within the virtual meeting.

3. The method of claim 1, wherein the monitoring for the attempt to share content comprises monitoring at least one of a chat window and a chat text entry area for reference to the collaboration platform.

4. The method of claim 3, wherein the reference to the collaboration platform comprises a uniform resource locator (URL) address.

5. The method of claim 1, wherein the monitoring for the attempt to share content comprises detection of a selection of a shareable window, wherein the shareable window is associated with the collaboration platform.

6. The method of claim 5, further comprising detecting a uniform resource locator (URL) address within meta data associated with the shareable window.

7. The method of claim 1, further comprises comparing an identifier for the collaboration platform and identifiers associated with the native application.

8. A system comprising:
one or more processors; and
a memory coupled to the one or more processors, the memory storing a plurality of instructions executable by the one or more processors, the plurality of instructions comprising instructions that when executed by the one or more processors cause the one or more processors to:
start a virtual meeting, within a video conferencing solution, between at least a first user and a second user;
monitor for an attempt to share content through a graphical user interface for the virtual meeting;
determine that the first user is attempting to show the shared content to the second user through a collaboration platform that is separate from the video conferencing solution;
identify a native application associated with the collaboration platform and integrated with the video conferencing solution;
notify the first user that the native application is available for collaboration within the virtual meeting; and
launch the native application within the virtual meeting.

9. The system of claim 8, further comprising:
determining that the native application is not installed within the video conferencing solution; and
installing the native application within the virtual meeting.

10. The system of claim 8, wherein the monitoring for the attempt to share content comprises monitoring at least one of a chat window and a chat text entry area for reference to the collaboration platform.

11. The system of claim 10, wherein the reference to the collaboration platform comprises a uniform resource locator (URL) address.

12. The system of claim 8, wherein the monitoring for the attempt to share content comprises detection of a selection of a shareable window, wherein the shareable window is associated with the collaboration platform.

13. The system of claim 12, further comprises detecting a uniform resource locator (URL) address within meta data associated with the shareable window.

14. The system of claim 8, further comprises comparing an identifier for the collaboration platform and identifiers associated with the native application.

15. A non-transitory computer-readable memory storing a plurality of instructions executable by one or more processors, the plurality of instructions comprising instructions that when executed by the one or more processors cause the one or more processors to:
start a virtual meeting, within a video conferencing solution, between at least a first user and a second user;
monitor for an attempt to share content through a graphical user interface for the virtual meeting;
determine that the first user is attempting to show the shared content to the second user through a collaboration platform that is separate from the video conferencing solution;
identify a native application associated with the collaboration platform and integrated with the video conferencing solution;
notify the first user that the native application is available for collaboration within the virtual meeting; and
launch the native application within the virtual meeting.

16. The non-transitory computer-readable memory of claim 15, further comprising:
determining that the native application is not installed within the video conferencing solution; and
installing the native application within the virtual meeting.

17. The non-transitory computer-readable memory of claim 15, wherein:
the monitoring for the attempt to share content comprises monitoring at least one of a chat window and a chat text entry area for reference to the collaboration platform; and
the reference to the collaboration platform comprises a uniform resource locator (URL) address.

18. The non-transitory computer-readable memory of claim 15, wherein the monitoring for the attempt to share content comprises detection of a selection of a shareable window, wherein the shareable window is associated with the collaboration platform.

19. The non-transitory computer-readable memory of claim 18, further comprises detecting a uniform resource locator (URL) address within meta data associated with the shareable window.

20. The non-transitory computer-readable memory of claim 15, further comprises comparing an identifier for the collaboration platform and identifiers associated with the native application.

* * * * *